United States Patent
Myers (10) Patent No.: US 10,771,490 B2
(45) Date of Patent: Sep. 8, 2020

(54) DETECTING ANOMALOUS NETWORK DEVICE ACTIVITY

(71) Applicant: Rapid7, Inc., Boston, MA (US)

(72) Inventor: Dustin Myers, Alexandria, VA (US)

(73) Assignee: Rapid7, Inc., Boston, MA (US)

( * ) Notice: Subject to any disclaimer, the term of this patent is extended or adjusted under 35 U.S.C. 154(b) by 191 days.

(21) Appl. No.: 16/202,282

(22) Filed: Nov. 28, 2018

(65) Prior Publication Data

US 2020/0169576 A1 May 28, 2020

(51) Int. Cl.
*H04L 29/06* (2006.01)
*H04L 12/26* (2006.01)

(52) U.S. Cl.
CPC ........ *H04L 63/1425* (2013.01); *H04L 43/045* (2013.01); *H04L 43/062* (2013.01); *H04L 63/1433* (2013.01); *H04L 63/168* (2013.01); *H04L 63/1416* (2013.01)

(58) Field of Classification Search
CPC . H04L 63/1425; H04L 63/168; H04L 43/045; H04L 43/062; H04L 63/1433; H04L 63/1416
See application file for complete search history.

(56) References Cited

U.S. PATENT DOCUMENTS

| | | | |
|---|---|---|---|
| 10,397,255 B1* | 8/2019 | Bhalotra | H04L 63/1416 |
| 10,686,811 B1* | 6/2020 | Ehle | G06N 20/00 |
| 2008/0101234 A1* | 5/2008 | Nakil | H04L 63/1425 370/235 |
| 2009/0180391 A1* | 7/2009 | Petersen | H04L 41/5025 370/252 |
| 2012/0017279 A1* | 1/2012 | Wakumoto | G06F 21/552 726/24 |
| 2015/0121518 A1* | 4/2015 | Shmueli | H04L 63/1425 726/22 |
| 2016/0234232 A1* | 8/2016 | Poder | H04L 63/1416 |
| 2016/0352686 A1* | 12/2016 | Wackerly | H04L 63/20 |
| 2017/0013003 A1* | 1/2017 | Samuni | G06F 11/00 |
| 2017/0026343 A1* | 1/2017 | Wardman | H04L 63/06 |
| 2017/0279847 A1* | 9/2017 | Dasgupta | H04L 12/66 |
| 2018/0091527 A1* | 3/2018 | Muthurajan | H04L 63/145 |
| 2019/0058719 A1* | 2/2019 | Kar | H04L 9/3239 |
| 2019/0098021 A1* | 3/2019 | Farmer | H04L 63/20 |
| 2019/0166141 A1* | 5/2019 | Xu | G06N 20/00 |
| 2020/0092167 A1* | 3/2020 | Khan | H04L 43/062 |

* cited by examiner

*Primary Examiner* — Cheng-Feng Huang
(74) *Attorney, Agent, or Firm* — Danielson Legal LLC (57) ABSTRACT

Methods and systems for detecting anomalous network device activity. The system may include an interface for receiving an identification label associated with a host device and pre-existing traffic data associated with the host device. The system may further detect that the pre-existing traffic data associated with the host device is anomalous based on the identification label. The system may then issue an alert upon detecting that the pre-existing traffic data associated with the host device is anomalous.

14 Claims, 4 Drawing Sheets

DETECTING ANOMALOUS NETWORK DEVICE ACTIVITY

TECHNICAL FIELD

Embodiments described herein generally relate to systems and methods for detecting anomalous network device activity and, more particularly but not exclusively, to systems and methods for detecting anomalous network device activity based on device classification.

BACKGROUND

Due to their prevalence in today's society, the internet and other types of networks have become a hub for criminal activity. Often times cyber-criminals or other threat actors attempt to install or otherwise deploy harmful applications on unprotected systems or devices. Once a threat actor obtains access to a targeted system or device, they may perform further actions such as stealing data, escalating their privileges, or the like.

Certain activity on a network may be indicative that a threat actor is, for example, profiling the network, profiling devices on the network, transferring data to/from network devices, installing harmful applications on network devices, or the like. For example, a high amount of network traffic may indicate an attack. Or, although not necessarily indicative of a threat, some network devices may exhibit behavior or act in ways that nonetheless warrant further investigation.

Existing techniques for gathering data regarding network device behavior or activity may involve actively scanning network devices. However, these techniques create new network traffic in addition to the network traffic already present. These active scanning tools may also undesirably affect the operation of network devices and increase congestion on networks.

A need exists, therefore, for systems and methods for detecting anomalous network device activity that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for detecting anomalous network device activity. The method includes receiving, using an interface, an identification label associated with a host device on a network and pre-existing traffic data associated with the host device; detecting, using a processor executing instructions stored on a memory, that the pre-existing traffic data associated with the host device is anomalous based on the identification label associated with the host device; and issuing, using the processor, an alert upon detecting that the pre-existing traffic data associated with the host device is anomalous.

In some embodiments, the method further includes analyzing, using the processor, the pre-existing traffic data associated with the host device; and assigning, using the processor, the identification label to the host device based on the pre-existing traffic data. In some embodiments, analyzing the pre-existing traffic data includes analyzing at least one of source connection metadata and destination connection metadata. In some embodiments, the identification label is based on previously-labeled host devices so that similar host devices with respect to traffic data are similarly labeled. In some embodiments, analyzing the pre-existing traffic data associated with the host device includes determining the host device is a destination address for a web connection, and assigning the identification label includes labeling the host device as a web server.

In some embodiments, the pre-existing traffic data includes communication ports used by the host device.

In some embodiments, the method further includes assigning an expected behavioral parameter to the host device based on the received identification label. In some embodiments, the method further includes detecting the pre-existing traffic data deviates from the expected behavioral parameter; and classifying the pre-existing traffic data as anomalous based on the data deviating from the expected behavioral parameter.

In some embodiments, the host device is selected from the group consisting of a computer, laptop, router, firewall, phone, and server.

In some embodiments, the host device is a medical monitoring device.

According to another aspect, embodiments relate to a system for detecting anomalous network device activity. The system includes an interface for receiving at least an identification label associated with a host device on a network and pre-existing traffic data associated with the host device; and a processor executing instructions stored on a memory to detect that the pre-existing traffic data associated with the host device is anomalous based on the identification label associated with the host device, and issue an alert upon detecting that the pre-existing traffic data associated with the host device is anomalous.

In some embodiments, the processor is further configured to analyze the pre-existing traffic data associated with the host device and assign the identification label to the host device based on the pre-existing traffic data. In some embodiments, the processor is configured to analyze the pre-existing traffic data by analyzing at least one of source connection metadata and destination connection metadata. In some embodiments, the identification label is based on previously-labeled host devices so that similar host devices with respect to traffic data are similarly labeled. In some embodiments, the processor is further configured to determine the host device is a destination address for a web connection based on the pre-existing traffic data and label the host device as a web server.

In some embodiments, the pre-existing traffic data includes communication ports used by the host device.

In some embodiments, the processor is further configured to assign an expected behavioral parameter to the host device based on the received identification label. In some embodiments, the processor is further configured to detect the pre-existing traffic data deviates from the expected behavioral parameter, and classify the pre-existing traffic data as anomalous based on the data deviating from the expected behavioral parameter.

In some embodiments, the host device is selected from the group consisting of a computer, laptop, router, firewall, phone, and server.

In some embodiments, the host device is a medical monitoring device.

BRIEF DESCRIPTION OF DRAWINGS

Non-limiting and non-exhaustive embodiments of this disclosure are described with reference to the following

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods in accordance with various embodiments described herein may rely on passive network data collection techniques to identify host devices on a network. In the context of the present application, the terms "host device," "endpoint device," or "network device" may refer to any type of device that communicates on a network. These devices may include, but are not limited to, computers, laptops, routers, firewalls, servers, phones, or otherwise any type of device that is initiating or receiving network traffic. This list is merely exemplary, and any other type of network device, whether available now or invented hereafter, may be used in conjunction with the features described herein.

During a training phase, the systems and methods described herein may first identify one or more host devices on a network. This identification step essentially provides the ground truth for asset management purposes and can help supplement IT inventory management tasks and workflows. For example, this identification step can result in a list of host devices currently active on a network based on actual network activity.

The systems and methods described herein may then analyze network activity such as source and destination connection metadata associated with one or more host devices. This metadata may help add context and understanding to devices identified in the identification step. The systems and methods described herein may then perform a behavioral analysis step and assign behavioral/identification labels to the devices based on the gathered metadata.

The systems and methods described herein may then perform a categorization step based on the behavior/identification labels assigned to the host devices. This categorization step may further involve clustering or otherwise grouping similar host devices together and predicting expected behaviors thereof.

For example, if an endpoint/host device (for simplicity, "host device") is the destination address of a web connection, the host device can be described as a web server. As another example, if a host device is the client side of a Kerberos connection, it is most likely a client host in an active directory WINDOWS® environment.

If a new host device appears on the network, the systems and methods described herein may then similarly analyze the behavior of the new host device and assign it an identification label. The new host device will then be grouped or otherwise clustered with other similar devices.

For example, it may be common to see secure shell (SSH) traffic for a first host device when database traffic is also present. Accordingly, it would not be unusual for a second host device that exhibits database traffic to also exhibit SSH traffic.

By clustering similar devices together, the systems and methods described herein may detect anomalous device activity that is inconsistent with the device's cluster group. For example, if a single host device makes many HTTPS and APACHE SUBVERSION® (SVN) connections, but not Remote Desktop Protocol (RDP) connections, the systems and methods described herein may identify this host device as a product developer.

If a new or otherwise previously unknown device makes many HTTPS and SVN connections, but not RDP connections, the systems and methods described herein may identify this new device as a web developer based on known web developer behavior. However, if this new device also makes RDP connections in addition to the HTTPS and SVN connections, the systems and methods described herein may consider this as anomalous activity that may be noted for further investigation.

Figure 1:
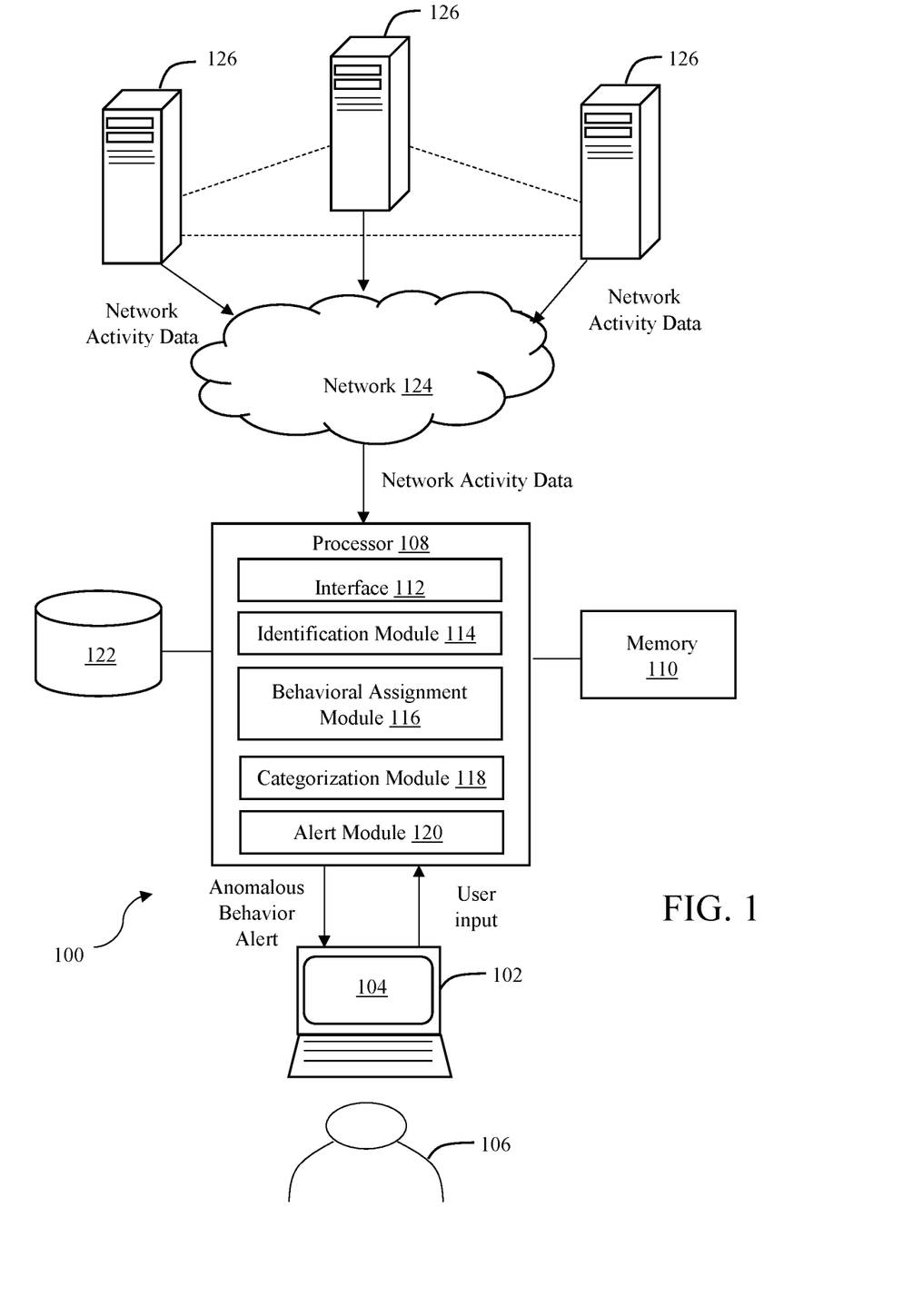
FIG. 1 illustrates a system for detecting anomalous network device activity in accordance with one embodiment.

FIG. 1 illustrates a system 100 for detecting anomalous network device activity in accordance with one embodiment. The system 100 may include a user device 102 executing a user interface 104 accessible by a user 106. The user interface 104 may allow a user 106 such as security personnel to view data regarding activity on a network, and may also issue alerts to the user 106 to inform the user 106 of anomalous device activity on the network.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

The user device 102 may be in operable communication with one or more processors 108. The processor(s) 108 may be any hardware device capable of executing instructions stored on memory 110 to detect anomalous network device activity to accomplish the objectives of various embodiments described herein. The processor 108 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located at some remote location.

The processor 108 may execute instructions stored on memory 110 to provide various modules that together can analyze network metadata to detect anomalous network device activity. Specifically, the processor 108 may execute or otherwise include an interface 112, an identification module 114, a behavioral assignment module 116, a categorization module 118, and an alert module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for detecting anomalous network device activity can be executed by the processor 108 to accomplish the features of various embodiments described herein.

The processor 108 may be in further operable communication with one or more databases 122. The database(s) 122 may store data accessible by the processor 108 to assist in detecting anomalous device activity. This data may relate to identified devices, the clusters to which identified devices are assigned, identification labels assigned to devices, expected behavioral parameters of the devices based on their clusters/identification labels, or the like.

The processor 108 may execute instructions stored on memory 110 and rely on data stored in the database(s) 122 to detect anomalous device activity on one or more networks 124 including one or more devices 126. The network(s) 124 may link the various devices with various types of network connections. The network(s) 124 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 124 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

As discussed previously, the network devices 126 may be any devices that receive and/or transmit data over the network(s) 124. These devices 126 may include servers, computers, medical equipment such as patient monitoring devices, telephones, printers, scanners, mobile devices, etc. The devices 126 used in conjunction with the features of the various embodiments described herein may vary and may depend on the application.

In operation, the interface 112 may receive data representative of activity on the network(s) 124. The system 100 may passively gather this network activity.

This is in contrast to many existing, active techniques for gathering data regarding a network. Active scanning techniques generally involve a scanning endpoint to generate traffic and additional network interactions with the devices of interest on the network. These active scanning techniques therefore create additional network traffic that otherwise would not exist. This additional traffic may therefore lead to network congestion and slow down other network devices.

Another disadvantage with actively scanning devices is that the scanning tools may themselves be perceived as threat actors scanning the network. This perception may trigger an intrusion detection system, and would ultimately be considered a false alert. The network may therefore require more resources to manage this additional traffic and unnecessary alerts. Additionally, users such as security personnel may become overwhelmed or at least distracted by these false alerts.

Active scanning may also have an adverse impact on certain devices such as those in healthcare settings. For example, actively scanning certain devices such as patient monitoring devices may disrupt the device's normal operation and may even cause the device to crash or otherwise malfunction. This may have a detrimental impact on a patient, especially if the disrupted device is a life support device or otherwise contributing to the patient's medical care.

Passive scanning techniques, on the other hand, are less intrusive. For example, passive scanning techniques generally only involve detecting one or more of the amount of pre-existing traffic on a network, the origin of the traffic, and the destination of the traffic.

By using passive scanning techniques and by analyzing pre-existing network traffic, the systems and methods described herein do not inject additional traffic into the network and therefore require less monitoring tools and resources than active scanning techniques. Additionally, the systems and methods described herein are not at risk of adversely impacting the normal operation of the other network devices.

The network activity data may be communicated to the interface 112 or otherwise to the processor 108 for analysis. As discussed previously, the identification module 114 may first identify and track one or more network devices 126. The identification module 114 essentially lays the ground truth for asset management and can help supplement IT inventory management tasks and workflows by providing a current list of host devices 126 active on the network(s) 124.

When a host device is observed communicating on a network segment, its existence is identified so that it can be tracked against known and/or tracked host devices. For example, if host_a communicates with host_b, it can be assumed that host_a and host_b are both host devices on one or more networks 124.

After the identification module 114 identifies one or more host devices, the behavioral assignment module 116 may observe activity associated with the identified devices. The behavioral assignment module 116 may conduct a port analysis to collect source and destination connection metadata, for example.

This type of analysis adds context and understanding to the identified devices by providing a high-level indication of the services the host devices offer and the clients serviced. Additionally, these analyses can be performed quickly at scale and are not subject to the opaqueness of encryption.

For example, if a connection is observed that is sourced from host_a going to host_b on port 21 (which is associated with the file transfer protocol (FTP)), then the behavioral assignment module 116 can assign an "ftp client" label to host_a and assign an "ftp server" label to host_b.

As another example, if a device is the destination address for a web connection (on port 80), the behavioral assignment module 116 can assign a "web server" identification label. As yet another example, if a host device is the client side of a Kerberos connection (on port 88), then it is most likely a client host in an active directory WINDOWS® environment.

Once the identification module 114 identifies devices and the behavioral assignment module 116 assigns identification labels based on the devices' detected behavior, the categorization module 118 may cluster the device(s) with other similar devices based on their network behavior. For example, FIG. 2 illustrates a clustering chart 200 showing clusters A, B, and C.

Figure 2:
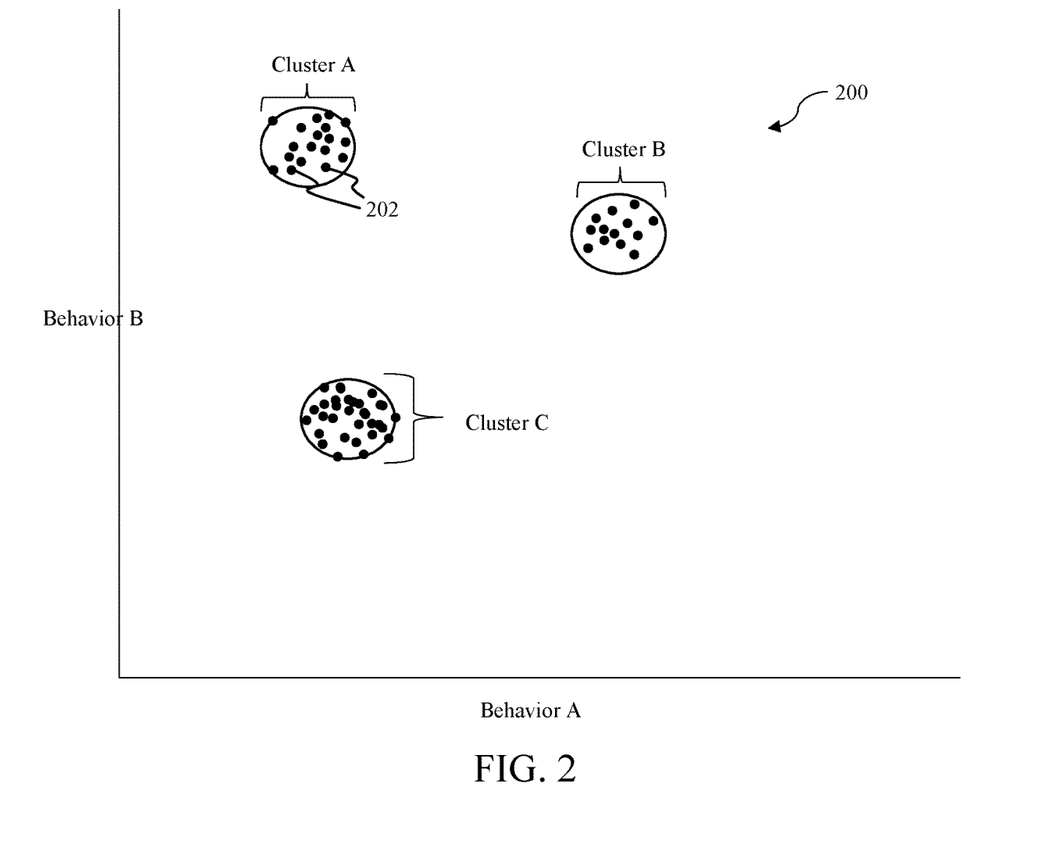
FIG. 2 illustrates a cluster chart showing clusters of network devices in accordance with one embodiment.

Each dot 202 of FIG. 2 may represent a device on a network. As seen in FIG. 2, the dots 202 may be assigned to a cluster of other devices based on the devices sharing common features/behaviors. As discussed previously, these behaviors may relate to ports/port combinations used and/or services offered, for example.

Each device 202 belonging to the same cluster may be assigned the same identification label. The categorization module 118 may also assign expected behavioral parameters to a device 202 based on its assigned identification label/cluster.

For example, host devices belonging to cluster A may regularly communicate on ports 1, 2, and 3, but also occasionally on port 4. If the identification module 114 identifies a new host device that communicates on ports 1, 2, and 4, it should be expected that this new host device may also communicate on port 3. If the new host device eventually does communicate on port 3, this behavior would be expected and would not be flagged as anomalous.

As another example, host devices on a given network that regularly communicate on ports 1, 2, 3, and 4 may almost always correspond to a user or device in a sales group of a company. Accordingly, these host devices may be assigned a "sales group" identification label and clustered with other host devices in the sales group.

In this case, a new host device may be observed communicating on ports 1, 2, 3, and 4 and assigned the "sales group" identification label as it would be expected that this new device is in the sales group. However, if the behavioral assignment module 116 detects that this new host device starts communicating in a developer subnet, the categorization module 118 may determine this behavior is anomalous as devices in the sales group are not known to communicate in the developer subnet. With respect to the cluster chart 200 of FIG. 2, this behavior may be illustrated as a dot that is removed or is otherwise distanced from the cluster corresponding to the assigned identification label.

The alert module 120 of FIG. 1 may then issue an alert via the user interface 104 to inform the user 106 that anomalous device activity was detected. The alert may be a visual-based alert, a text-based alert, an audio-based alert, a haptic-based alert, or some combination thereof.

The user 106 may view the data associated with the anomalous activity. For example, the user interface 104 may present the traffic data that caused the alert. The user 106 may then take (or not take) any appropriate action in response to the issued alert. Additionally or alternatively, the system 100 may be configured to autonomously perform any appropriate actions to address the anomalous activity.

Figure 3:
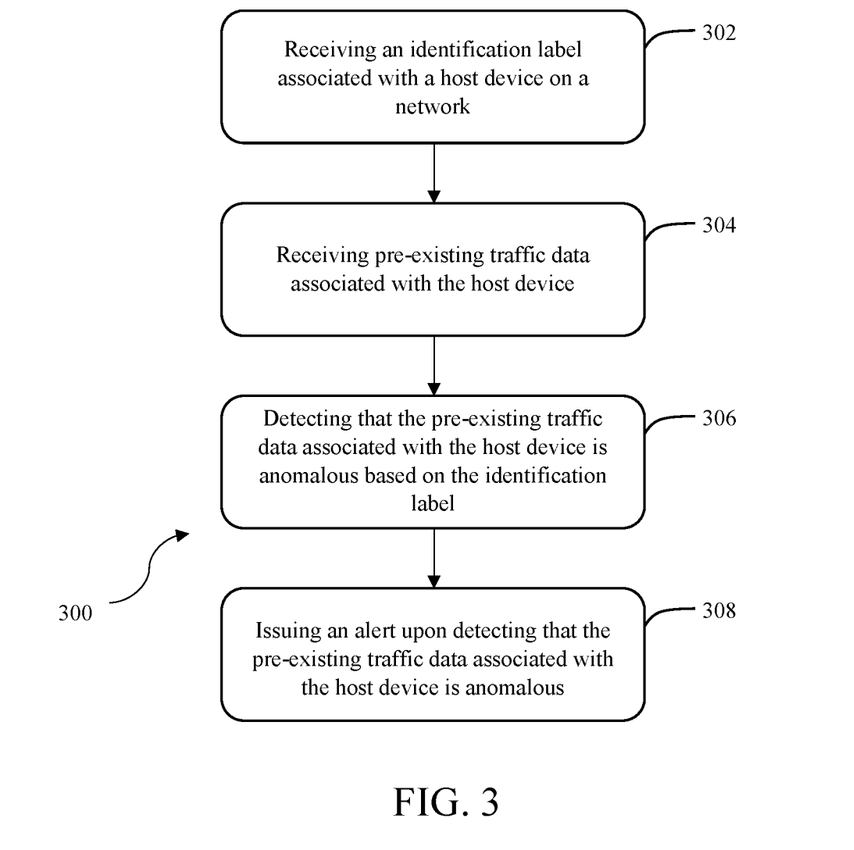
FIG. 3 depicts a flowchart of a method for detecting anomalous network device activity in accordance with one embodiment.

FIG. 3 depicts a flowchart of a method 300 for detecting anomalous network device activity in accordance with one embodiment. Step 302 involves receiving, using an interface, an identification label associated with a host device on a network. For example, the identification label may be received from one or more processors configured to analyze traffic data to classify a network device and assign the device an associated identification label based on the classification.

Step 304 involves receiving, using the interface, pre-existing traffic associated with the host device. The pre-existing traffic data may include data such as source and destination connection metadata, for example.

Step 306 involves detecting, using a processor executing instructions stored on a memory, that the pre-existing traffic data associated with the host device is anomalous based on the identification label associated with the host device. For example, it may be expected that a host device with a certain identification label will/will not communicate using certain ports. If the processor detects that a host device does communicate these unexpected ports, it may classify this activity as anomalous.

Step 308 involves issuing, using the processor, an alert upon detecting that the pre-existing traffic data associated with the host device is anomalous. For example, if a processor detects data indicative of anomalous behavior of the host device (e.g., the host device communicates using an unexpected port), the processor may issue an alert using a user interface to inform a user of the detected anomalous activity. The alert may be a visual-based alert, a text-based alert, an audio-based alert, a haptic-based alert, or some combination thereof.

Figure 4:
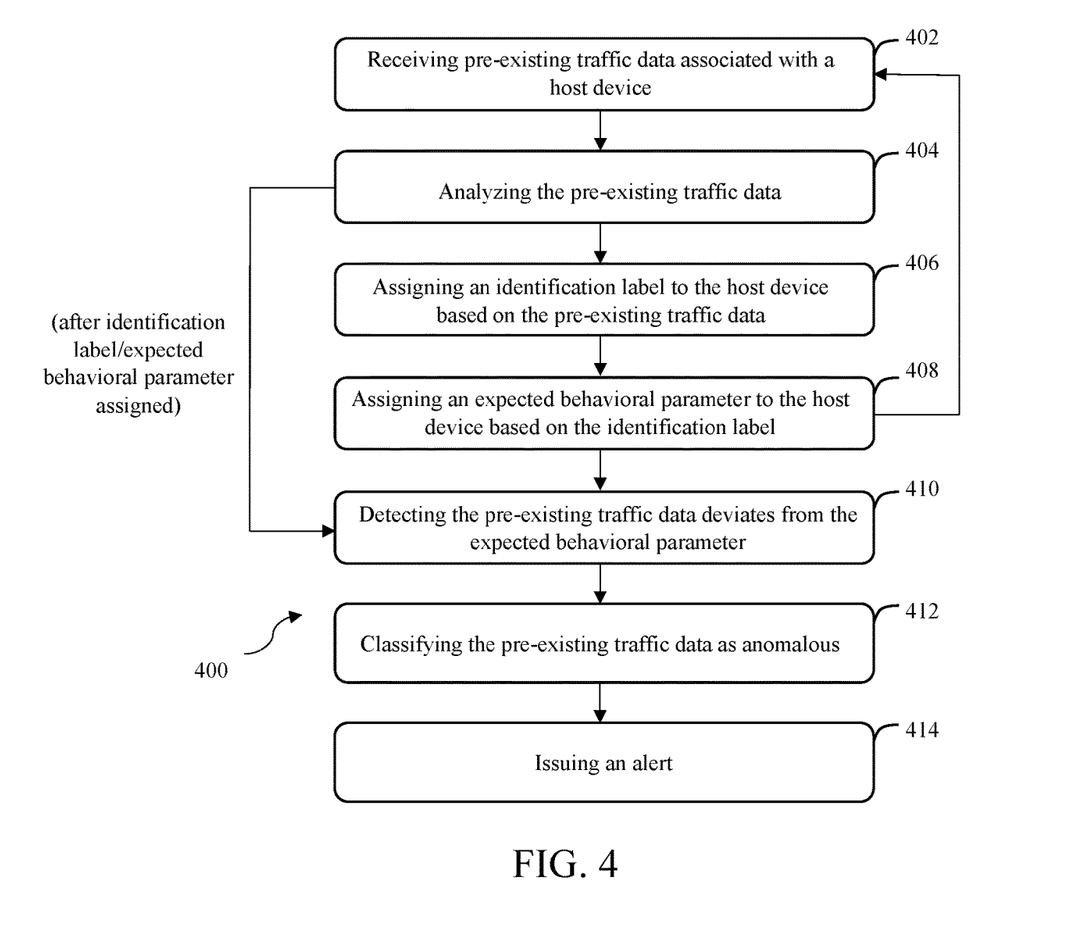
FIG. 4 depicts a flowchart of a method for detecting anomalous network device activity in accordance with another embodiment.

FIG. 4 depicts a flowchart of method 400 for detecting anomalous network device activity in accordance with one embodiment. Step 402 involves receiving pre-existing traffic data associated with a host device. Step 402, accordingly, relies on passive scanning techniques to obtain pre-existing traffic data as opposed to injecting new traffic into a network, as with active scanning techniques.

Step 404 involves analyzing the pre-existing traffic data associated with the host device. The processor may analyze network communication data such as source and destination connection metadata, for example. Accordingly, the systems and methods described herein are not necessarily concerned with the actual content of network traffic, but only data about the network connections themselves.

Step 406 involves assigning an identification label to the host device based on the pre-existing traffic data. For example, a processor such as the processor 108 of FIG. 1 may recognize that certain behavior of the host device is similar to the behavior of known network devices that are clustered together based on their sharing of the same behavior. In some embodiments, the processor 108 may recognize that the host device communicates using a specific set of ports and is therefore similar to a cluster of network devices that also communicate using the same set of ports. These clustered network devices may be identified as network devices that belong to a sales group, for example. Accordingly, the processor may then assign an identification label to the host device.

Step 408 involves assigning, using the processor, an expected behavioral parameter to the host device based on the identification label. In other words, a host device may be expected to act or otherwise behave in a certain way based on its identification label.

An expected behavioral parameter may relate to certain ports the host device is expected to use and/or certain ports the host device is expected not to use. Other behavioral parameters may include, but are not limited to, times of connections, connection durations, or the like.

After an identification label/behavioral parameter is assigned or otherwise received, the method 400 may proceed back to step 402. That is, pre-existing traffic data associated with the host device may be continuously received and analyzed (in other words, the method 400 may iterate steps 402 and 404).

However, method 400 may then proceed to step 410, which involves detecting that the pre-existing traffic data deviates from the expected behavioral parameter. For example, a deviation may occur if the host device communicates using a port that it was expected not to use.

Step 412 involves classifying the pre-existing traffic data as anomalous based on the data deviating from the expected behavioral parameter. This classification may be based on deviations from one or more expected behavioral parameters. For example, a processor may be configured to classify activity as anomalous only if it detects deviations from two or more expected behavioral parameters. This may help reduce false positives, for example.

Step 414 involves issuing an alert regarding the detected anomalous activity. The alert may be communicated to a user via any suitable user interface to inform the user of the detected anomaly. The alert may include a visual alert, a text-based alert, an audio alert, a haptic-based alert, or some combination thereof. The user may then review the traffic data associated with the alert and perform any appropriate mitigation or remedial actions. Additionally or alternatively, the systems and methods described herein may autonomously perform any appropriate mitigation or remedial actions about detecting anomalous network device activity.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for detecting anomalous network device activity, the method comprising:
    receiving, using an interface, pre-existing traffic data associated with a host device;
    analyzing, using a processor executing instructions stored on a memory, the pre-existing traffic data associated with the host device;
    assigning, using the processor, an identification label to the host device based on the pre-existing traffic data;
    assigning an expected behavioral parameter to the host device based on the identification label;
    detecting the pre-existing traffic data deviates from the expected behavioral parameter;
    classifying the pre-existing traffic data as anomalous based on the data deviating from the expected behavioral parameter; and
    issuing, using the processor, an alert upon classifying the pre-existing traffic data associated with the host device as anomalous.

2. The method of claim 1 wherein analyzing the pre-existing traffic data includes analyzing at least one of source connection metadata and destination connection metadata.

3. The method of claim 1 wherein the identification label is based on previously-labeled host devices so that similar host devices with respect to traffic data are similarly labeled.

4. The method of claim 1 wherein analyzing the pre-existing traffic data associated with the host device includes determining the host device is a destination address for a web connection, and assigning the identification label includes labeling the host device as a web server.

5. The method of claim 1 wherein the pre-existing traffic data includes communication ports used by the host device.

6. The method of claim 1 wherein the host device is selected from the group consisting of a computer, laptop, router, firewall, phone, and server.

7. The method of claim 1 wherein the host device is a medical monitoring device.

8. A system for detecting anomalous network device activity, the system comprising:
    an interface for receiving at least pre-existing traffic data associated with a host device; and
    a memory and a processor executing instructions stored on the memory to:
        analyze the pre-existing traffic data associated with the host device;
        assign an identification label to the host device based on the pre-existing traffic data;
        assign an expected behavioral parameter to the host device based on the identification label;
        detect the pre-existing traffic data deviates from the expected behavioral parameter;
        classify the pre-existing traffic data as anomalous based on the data deviating from the expected behavioral parameter; and
        issue an alert upon classifying the pre-existing traffic data associated with the host device as anomalous.

9. The system of claim 8 wherein the processor is configured to analyze the pre-existing traffic data by analyzing at least one of source connection metadata and destination connection metadata.

10. The system of claim 8 wherein the identification label is based on previously-labeled host devices so that similar host devices with respect to traffic data are similarly labeled.

11. The system of claim 8 wherein the processor is further configured to determine the host device is a destination address for a web connection based on the pre-existing traffic data, and label the host device as a web server.

12. The system of claim 8 wherein the pre-existing traffic data includes communication ports used by the host device.

13. The system of claim 8 wherein the host device is selected from the group consisting of a computer, laptop, router, firewall, phone, and server.

14. The system of claim 8 wherein the host device is a medical monitoring device.

* * * * *